United States Patent
Goldstein et al.

(10) Patent No.: US 7,412,375 B2
(45) Date of Patent: Aug. 12, 2008

(54) SPEECH QUALITY ASSESSMENT WITH NOISE MASKING

(75) Inventors: Tom Goldstein, Ipswich (GB); Paul Alexander Barrett, Ipswich (GB); Antony William Rix, Cambridge (GB)

(73) Assignee: Psytechnics Limited, Ipswich (GB)

(*) Notice: Subject to any disclaimer, the term of this patent is extended or adjusted under 35 U.S.C. 154(b) by 834 days.

(21) Appl. No.: 10/874,156

(22) Filed: Jun. 22, 2004

(65) Prior Publication Data

US 2005/0015245 A1    Jan. 20, 2005

(30) Foreign Application Priority Data

Jun. 25, 2003  (EP) .................. 03254037

(51) Int. Cl.
*G10L 21/02* (2006.01)
*H04R 29/00* (2006.01)

(52) U.S. Cl. .............. 704/200.1; 704/228; 381/58

(58) Field of Classification Search ........... 704/200.1, 704/210, 215, 225, 226, 227, 228; 379/27.01, 379/27.03, 27.08; 381/1, 56, 58
See application file for complete search history.

(56) References Cited

U.S. PATENT DOCUMENTS

| | | | | |
|---|---|---|---|---|
| 5,341,457 A | * | 8/1994 | Hall et al. | 704/226 |
| 5,621,854 A | * | 4/1997 | Hollier | 704/200.1 |
| 6,035,270 A | * | 3/2000 | Hollier et al. | 704/202 |
| 6,157,830 A | * | 12/2000 | Minde et al. | 455/424 |
| 6,271,771 B1 | * | 8/2001 | Seitzer et al. | 341/50 |
| 6,691,086 B2 | * | 2/2004 | Lokhoff et al. | 704/229 |
| 6,718,296 B1 | * | 4/2004 | Reynolds et al. | 704/200.1 |
| 6,775,240 B1 | * | 8/2004 | Zhang et al. | 370/251 |
| 7,013,266 B1 | * | 3/2006 | Berger | 704/203 |
| 7,024,352 B2 | * | 4/2006 | Beerends et al. | 704/200.1 |

(Continued)

FOREIGN PATENT DOCUMENTS

EP    1 206 104 A    5/2002

OTHER PUBLICATIONS

Goldstein et al., "Perceptual Speech Quality Assessment in Acoustic and Biaural Applications," Proceeding IEEE International Conference on Acoustics, Speech, and Signal Processing, 2004, May 17-21, 2004, vol. 3, pp. 1064 to 1067.*

(Continued)

*Primary Examiner*—Martin Lerner
(74) *Attorney, Agent, or Firm*—Burr & Brown

(57) ABSTRACT

A method and apparatus for assessing the perceptual quality of stereo speech signals transmitted via a telecommunications network and recorded acoustically from an acoustic terminal device in which a mono reference signal comprising a single channel is aligned with a degraded stereo signal comprising a left and a right channel; a delay between each channel of said degraded signal and said reference signal is estimated; a noise masking indicator in dependence upon said estimated delays is generated; the level of the stereo signals is adjusted in dependence upon said noise masking indicator; a set of perceptually relevant parameters for each of said reference and degraded signals are generated; the perceptually relevant parameters of the reference signal with the perceptually relevant parameters of the degraded signal to generate a disturbance profile are compared; and a speech quality prediction is generated in dependence upon said disturbance profile.

19 Claims, 7 Drawing Sheets

U.S. PATENT DOCUMENTS

| | | | |
|---|---|---|---|
| 7,120,256 B2 * | 10/2006 | Grancea et al. | 381/55 |
| 7,146,313 B2 * | 12/2006 | Chen et al. | 704/230 |
| 7,165,025 B2 * | 1/2007 | Kim | 704/206 |
| 2001/0044713 A1 * | 11/2001 | Lokhoff et al. | 704/201 |
| 2002/0193999 A1 * | 12/2002 | Keane et al. | 704/270 |
| 2003/0091194 A1 * | 5/2003 | Teichmann et al. | 381/2 |
| 2003/0115042 A1 * | 6/2003 | Chen et al. | 704/200.1 |
| 2003/0156633 A1 * | 8/2003 | Rix et al. | 375/225 |
| 2003/0187634 A1 * | 10/2003 | Li | 704/200.1 |
| 2003/0235311 A1 * | 12/2003 | Grancea et al. | 381/58 |

OTHER PUBLICATIONS

Rix et al., "Perceptual Evaluation of Speech Quality(PESQ)—A New Method for Speech Quality Assessment of Telephone Networks and Codecs," Proceeding IEEE International Conference on Acoustics, Speech, and Signal Processing, 2001, May 7-11, 2001, vol. 2, pp. 749 to 752.*

Rix A W et al: "PESQ—the new ITU standard for end-to-end speech quality assessment" 109th Convention of the Audio Engineering Society (AES), Los Angeles, 'Online! Sep. 22-25 2000,XP002262437, Retrieved from the Internet: <URL;http//www.psytechnics.com/papers/2000-P02.pdf> 'retrieved on Nov. 19, 2003! abstract p. 9,line 1—p. 11, line 34; figure 5.

Thiede T et al: "PEAQ—The ITU Standard for Objective Measurement of Perceived Audio Quality" Journal of the Audio Engineering Society, New York, US, vol. 48, No. 1/2, Jan. 2000, pp. 3-29, XP000928471 ISSN: 0004-7554 Abstract Fig. 4 *p. 8, right-hand col. line 23—p.9, left-hand col. line 22 *p. 10, left-hand col. line 27—right-hand col. line 44.

John Anderson: "Methods for Measuring Perceptual Speech Quality" Agilent Technologies Network Systems Test Division, XX, XX, Mar. 1, 2001, pp. 1-34, XP 002172414 p. 2 p. 3.

* cited by examiner

SPEECH QUALITY ASSESSMENT WITH NOISE MASKING

This application claims the benefit of United Kingdom Application No. EP 03254037.9, filed 25 Jun. 2003, the entirety of which is incorporated herein by reference.

This invention relates to a speech quality assessment system.

Signals carried over telecommunications links can undergo considerable transformations, such as digitisation, encryption and modulation. They can also be distorted due to the effects of lossy compression and transmission errors. Furthermore, they may be distorted by the acoustic interface being used.

Objective processes for the purpose of measuring the quality of a signal have been under development for a number of years. Such objective processes are of application in equipment development, equipment testing, and evaluation of system performance. Traditionally quality assessment systems have been categorised as either intrusive or non-intrusive.

Intrusive quality assessment systems require a known (reference) signal to be played through a distorting system (the communications network or other system under test) to derive a degraded signal, which is compared with an undistorted version of the reference signal. Such systems are known as "intrusive", because whilst the test is carried out the channel under test cannot, in general, carry live traffic.

Conversely, non-intrusive quality assessment systems are systems which can be used whilst live traffic is carried by the channel, without the need for test calls.

Non-intrusive testing is often required because for some testing it is not possible to make test calls. This could be because the call termination points are geographically diverse or unknown. It could also be that the cost of capacity is particularly high on the route under test. A non-intrusive monitoring application can run all the time on the live calls to give a meaningful measurement of performance.

In order to test the performance of quality assessment systems a database of distorted samples each of which has been assessed by panels of human listeners to provide a Mean Opinion Score (MOS) is used.

MOSs are generated by subjective tests which aim to find the average user's perception of a system's speech quality by asking a panel of listeners a directed question and providing a limited response choice. For example, to determine listening quality users are asked to rate "the quality of the speech" on a five-point scale from Bad to Excellent. The MOS, is calculated for a particular condition by averaging the ratings of all listeners.

One problem with known quality assessment systems is that they do not allow for the acoustic interface (for example a mobile handset) and in particular the effects of noise in the ear which is not being used for a telephone call is not taken into account. Furthermore, when both ears are being used for the telephone call the perceptual improvement due to the perceived level gain is not taken into account.

According to the invention there is provided an apparatus for assessing the perceptual quality of speech signals transmitted via a telecommunications network and recorded acoustically from an acoustic terminal device comprising: a front end processor for aligning a mono reference signal comprising a single channel with a degraded stereo signal comprising a first channel and a second channel, said front end processor comprising a leveller for adjusting the power levels of said signals and a time aligner for determining the estimated delays for each of said channels of said degraded signal; an auditory transformer for generating a set of perceptually relevant parameters for each of said signals; and a comparator for comparing said perceptually relevant parameters to generate disturbance profiles; and a modeller for generating a speech quality prediction in dependence upon said disturbance profiles; in which said front end processor further comprises a noise masking determiner for comparing signal parameters of each of said channels of said degraded signal and generating a noise masking indicator in dependence upon said parameters; and in which said disturbance profiles are dependent upon said noise masking indicator.

In one embodiment of the invention the leveller adjusts the level of said signals in dependence upon whether noise masking is indicated. This results in different sensation surfaces, and hence different disturbance profiles depending upon whether noise masking is indicated or not.

In another embodiment of the invention the comparator is arranged to receive the noise masking indicator and in which the comparator is arranged to modify a disturbance profile in dependence upon a comparison between a disturbance profile for one channel and a set of perceptually relevant parameters for another channel when noise masking is indicated.

It is an advantage if the comparator is arranged to receive a voice activity signal and the disturbance profile is modified in dependence upon said voice activity signal.

The signal parameters used to determine whether noise masking is to be performed may be the estimated delays. If so then it is an advantage if the noise masking determiner further comprises means for receiving an estimate of the confidence that each of said estimated delays is correct, and if said noise masking indicator is also dependent upon said estimated confidences.

In an embodiment where the leveller adjusts the level of said signals in dependence upon whether noise masking is indicated the leveller is arranged to
 a) to adjust the level of each of said channels of the degraded signal in dependence upon only one channel of the signal when noise masking is indicated; and
 b) to adjust the level of each of said channels (2a, 2b) of the degraded signal independently when noise masking is not indicated.

Preferably the leveller is arranged to adjust the level of both channels in order to achieve a first predetermined RMS power level for said one channel at step a) and in which said levelling means is arranged to adjust the level of each of said channels to achieve a second predetermined RMS power level for both channels at step b).

It is an advantage if the second predetermined level is greater than said first predetermined level in order to account for the perceived advantage when speech is present in both channels.

According to another aspect of the invention there is also provided a method of assessing the perceptual quality of stereo speech signals transmitted via a telecommunications network and recorded acoustically from an acoustic terminal device comprising the steps of aligning a mono reference signal comprising a single channel with a degraded stereo signal comprising a first channel and a second channel estimating a delay between each channel of said degraded signal and said reference signal; generating a noise masking indicator in dependence upon a comparison of corresponding signal parameters for each channel; generating a set of perceptually relevant parameters for each of said reference and degraded signals; comparing said perceptually relevant parameters of the reference signal with the perceptually relevant parameters of the degraded signal to generate disturbance profiles; and generating a speech quality prediction in dependence upon said disturbance profiles; wherein said generated disturbance profiles are dependent upon said noise masking indicator.

In one embodiment of the invention the method further comprises the step of adjusting the level of the degraded signals in dependence upon said noise masking indicator. This results in different sensation surfaces, and hence different disturbance profiles depending upon whether noise masking is indicated or not.

In another embodiment of the invention the comparing step comprises the sub-step of: modifying a disturbance profile in dependence upon a comparison between a disturbance profile for one channel and a set of perceptually relevant parameters for the other channel when noise masking is indicated by said noise masking indicator.

It is an advantage if the modifying step is performed in dependence upon a voice activity signal.

The signal parameters used to determine whether noise masking is to be performed may be the estimated delays. If so then it is an advantage if the noise masking indicator is also dependent upon estimates of the confidence that each of said estimated delays is correct.

In an embodiment where the level of said signals is adjusted in dependence upon whether noise masking is indicated the method further comprises:

c) adjusting the level of each of said channels of the degraded signal in dependence upon only one channel of the signal when noise masking is indicated; and d) adjusting the level of each of said channels of the degraded signal when noise masking is not indicated.

Preferably step c) comprises adjusting the level of both channels in order to achieve a first predetermined RMS power level for one channel and in which step d) comprises adjusting the level of both channels independently to achieve a second predetermined RMS power level for both channels.

It is an advantage if the first predetermined level is greater than the second predetermined level.

The invention also provides a computer readable medium carrying a computer program, and a computer program for implementing the methods described above.

Embodiments of the invention will now be described, by way of example only, with reference to the following figures in which.

Figure 1:
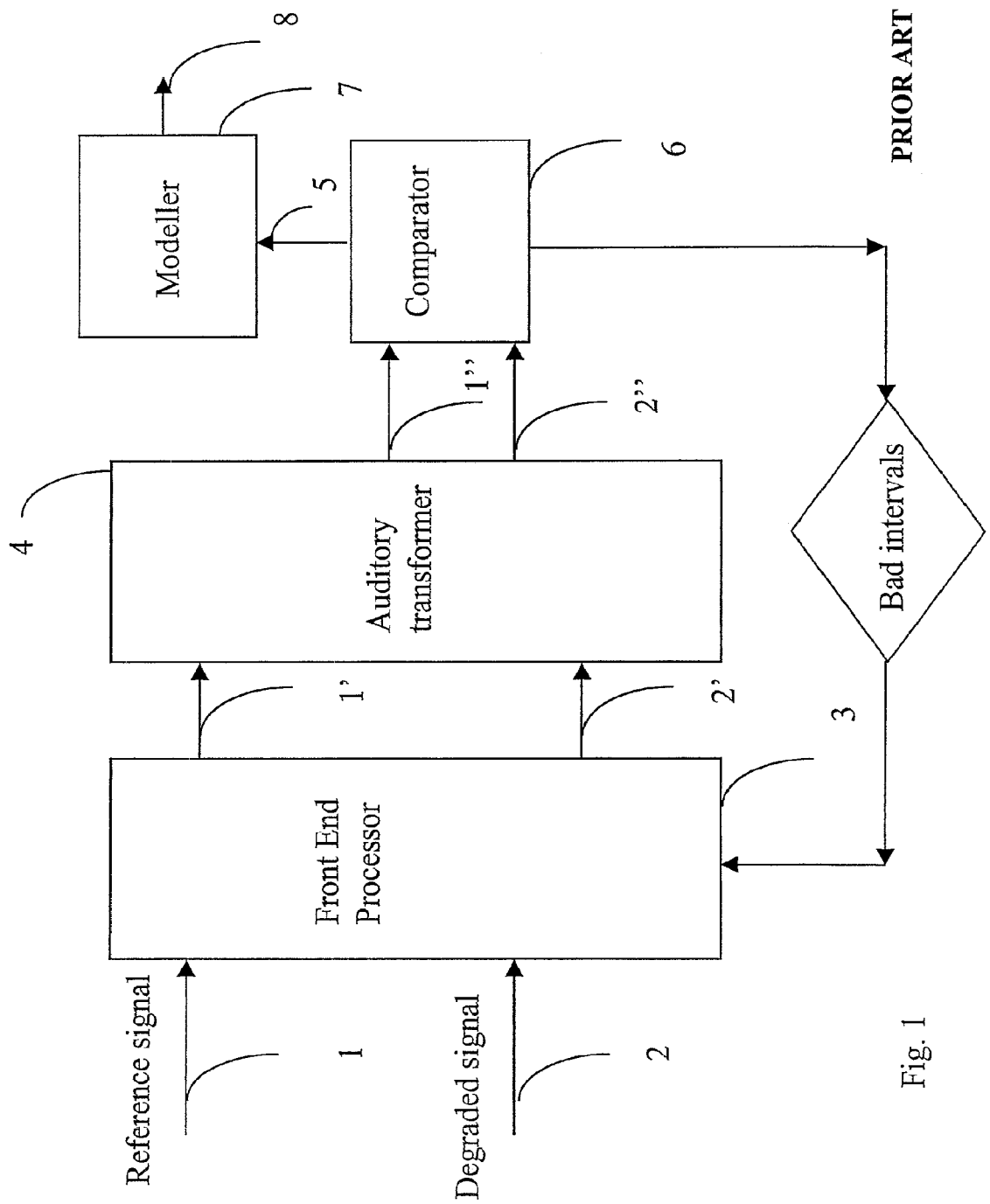
FIG. 1 illustrates a known speech quality assessment system.

An outline of an assessment method will now be described with reference to FIG. 1, which shows schematically a quality assessment tool in which a reference signal 1 is compared with a degraded signal 2.

A front end processor 3 aligns the two signals adjusting both signal levels, and aligning in time to generate pre-processed signals 1', 2' respectively. An auditory transform is applied by auditory transformer 4 to each of the pre-processed signals, to generate "sensation surfaces" 1", 2" which are a perceptually significant representation of signals 1, 2 (i.e. what is audible/of importance to an average listener) in each of the signals 1,2 respectively. The sensation surfaces 1" 2" are then compared with each other by a comparator 6, and a resulting disturbance profile 5 is passed to a cognitive modeller 7 which generates a speech quality prediction 8.

Figure 2:
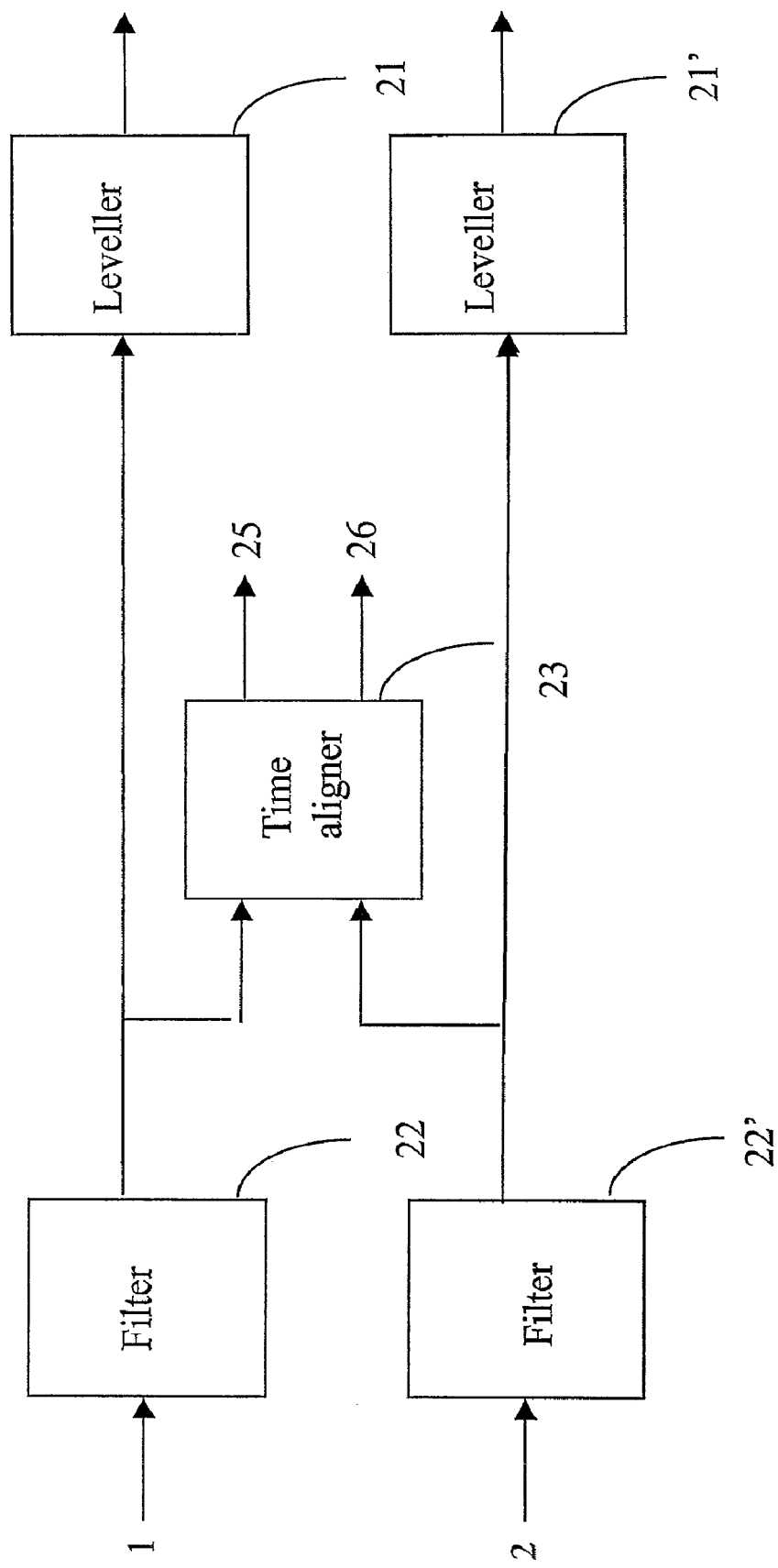
FIG. 2 illustrates a known front end processor.

FIG. 2 illustrates the front end processor 3 in more detail.

Each signal 1,2 is filtered by respective filters 22, 22' which take account of characteristics of the listening handset. In the case of acoustic recordings which will be listened to via wideband headphones this filter will be wideband. For telephony speech quality assessment this filter will be narrowband.

A time aligner 23 carries out time alignment in two stages. Firstly a crude alignment is preformed by roughly calculating the delay between the two signals using information provided by a voice activity detector (VAD) within the aligner 23. Secondly a fine alignment is performed by using a cross correlation of overlapping windows of each speech signal to generate a more accurate estimate of the delay between the two signals. In addition the fine aligner produces an estimate, based on statistical measures of similarity, of the confidence of the accuracy of the delay estimate. It is possible that, delay variations occur during a speech utterance, and the alignment, algorithm used by the aligner 23 accounts for this by recursively splitting and re-aligning time intervals in each utterance until an optimum alignment is determined. The output, from the aligner 23 comprises a delay estimate 25 and a confidence value 26 for each utterance within the signal.

Each signal is also processed by a leveller 21 such that the average signal level is set to a predetermined level. In this embodiment of the invention the predetermined signal level is set to 79 dB Sound Pressure Level (SPL).

Figure 3:
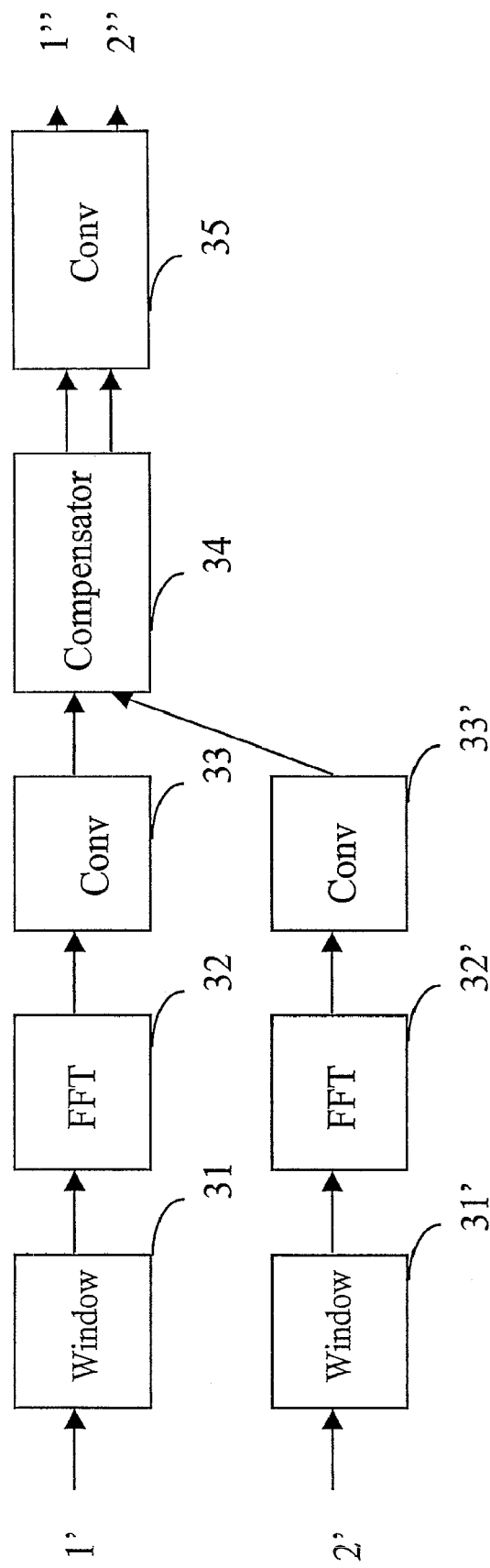
FIG. 3 illustrates a known auditory transformer.

The auditory transformer 4 will now be described with reference to FIG. 3. The auditory transformer provides the parameters which are used to compare the characterisations of the speech signals. As such, it is important that parameters are used which are significant to the perceptual quality of the degraded signal.

The received signals 1', 2' are filtered by respective filters 31, 31' using a Hanning window. In this embodiment of the invention a 32 ms Hanning window is used. Then a fast, Fourier Transform (FFT) is applied to the windowed signal by respective transformers 32, 32'. The resulting frequency values are then warped by respective converters 33, 33' in order to account for the fact that at lower frequencies the human auditory system has finer frequency resolution that at higher frequencies. In this embodiment the frequency values are converted from a linear Hertz to a warped Bark scale. This is achieved by generating one Bark value from a number of Hertz values at higher frequencies using an averaging function.

Compensator 34 is used to compensate for the inherent transfer function of the system under test. Both the reference signal and the degraded signal are used by the compensator 34 to calculate a partial compensation factor based on the average power densities of the respective signals.

Local gain compensation is also applied based on the ratio between the two received signals when a predetermined hearing threshold is exceeded.

Finally each signal is converted to the Sone loudness scale using Zwickers law by warp-loudness converter 35.

Referring back to FIG. 1, the resulting sensation surfaces 1" and 2" are compared to each other by the comparator 6. If the disturbance profile 5, which is effectively a measure of how perceptually different the reference signal 1 and the degraded signal 2 are from each other, is greater than a predetermined threshold then it is assumed that is it possible that this is due to a bad alignment, and such 'bad intervals' may be realigned before reprocessing as described previously.

Thus far the speech assessment system described is conventional (for example see ITU-T P.862). The extension of such a known speech assessment system to include noise masking will now be described with reference to FIGS. 4 to 7.

Figure 4:
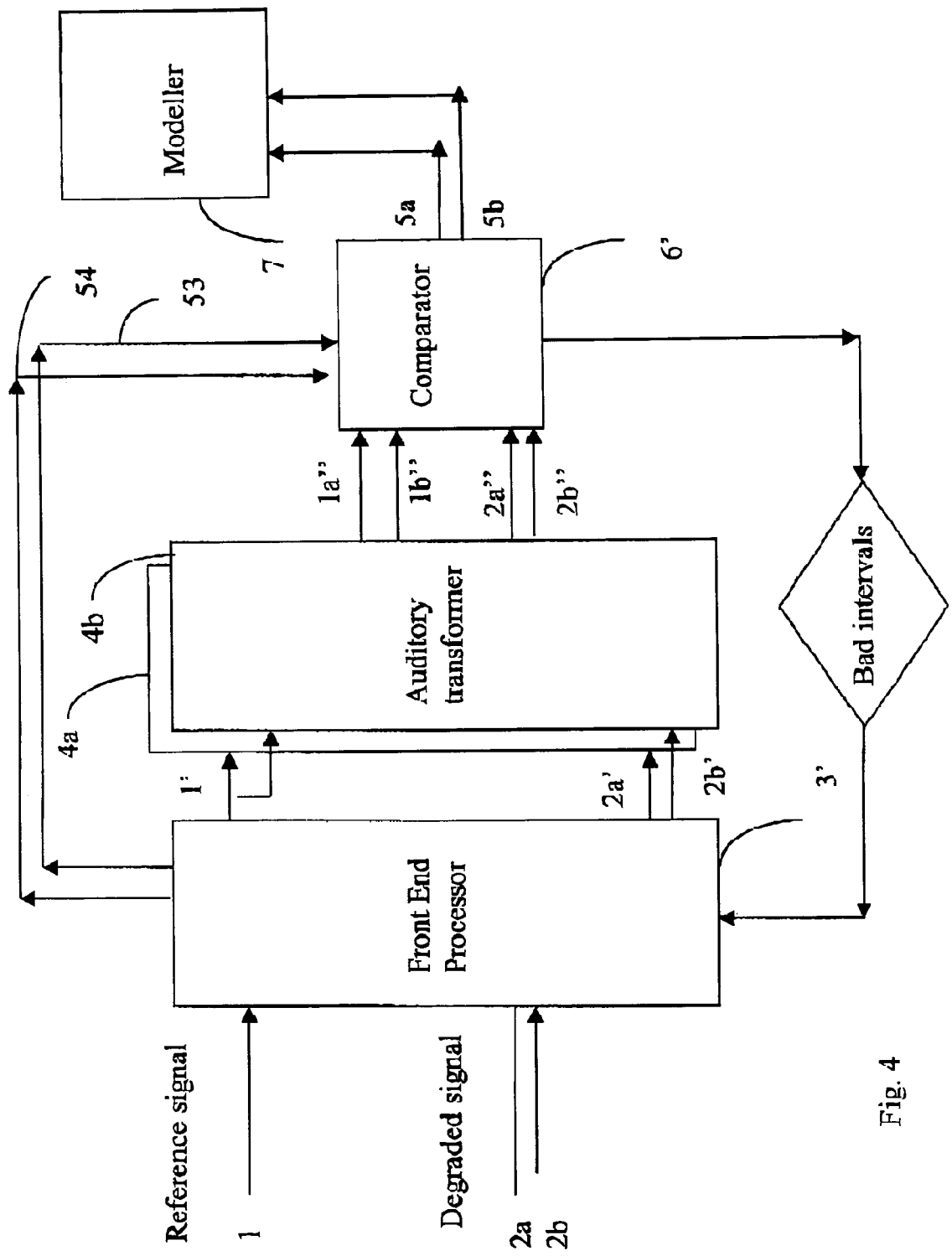
FIG. 4 illustrates a speech quality assessment system in accordance with the present invention.

Referring now to FIG. 4 which illustrates a binaural quality assessment system, a reference signal 1 is compared to a degraded signal 2 comprising a left degraded signal 2a and a right degraded signal 2b. In the following description it is assumed that the right channel typically contains speech and that the left channel contains either noise or speech, although the invention is equally applicable if the channels are reversed or are provided in other formats such as sum/difference or as more than two separate channels to be mixed according to some predetermined method.

Figure 5:
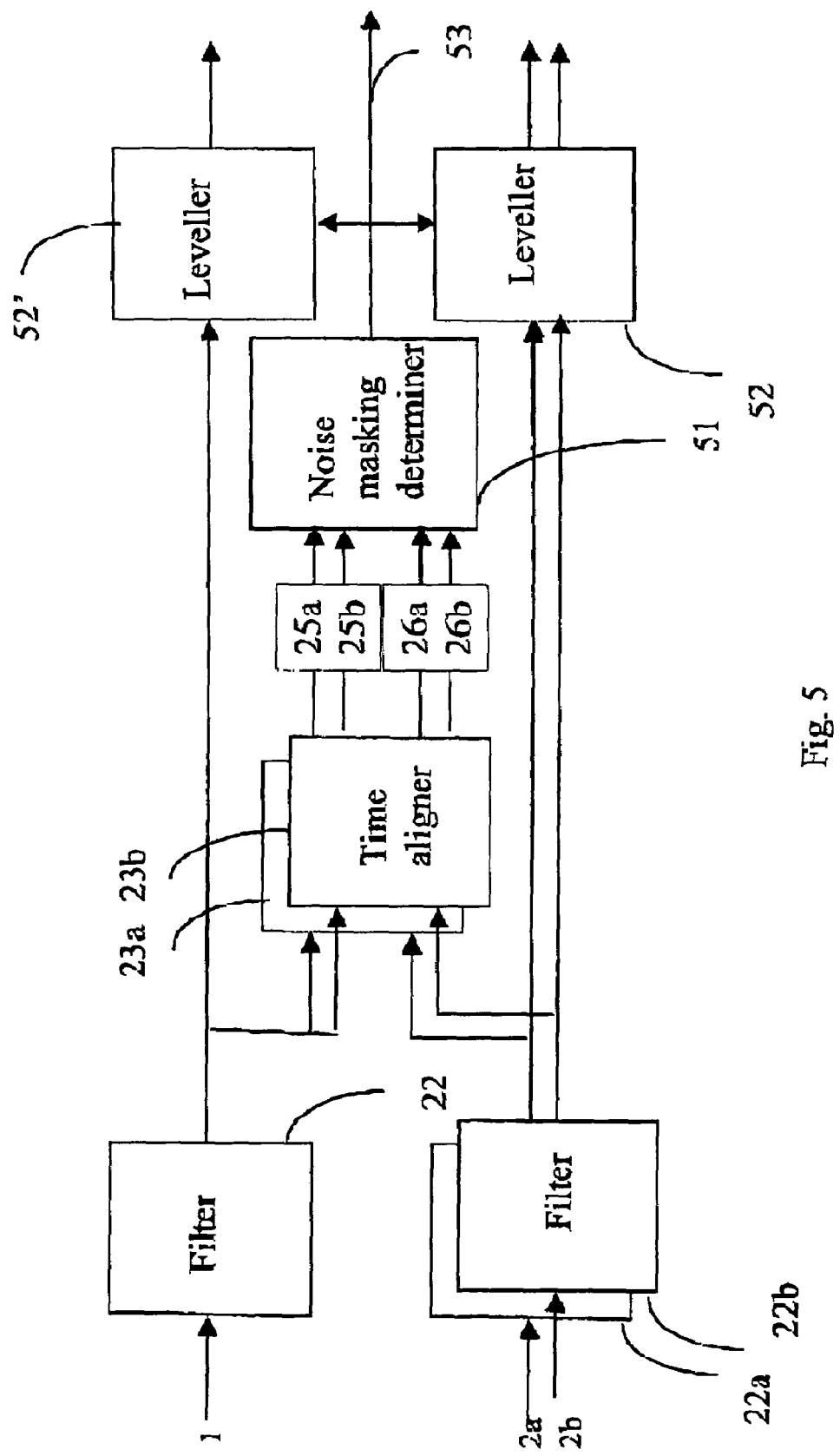
FIG. 5 illustrates a front end processor in accordance with the present invention.

Referring now to FIG. 5 which illustrates part of Front End Processor 3', time aligner 23a aligns the reference signal 1 and the left degraded signal 2a, and time aligner 23b aligns the reference signal 1 and the right degraded signal 2b.

Resulting delay estimates 25a and 25b and confidence values 26a and 26b are sent to the noise masking determiner 51. The noise masking determiner 51 indicates whether or not noise masking is to be applied in dependence upon these received signals.

If the difference between total estimated delay for all utterances in each degraded signal is greater than a predetermined value and if the estimated confidence that the delay in the left degraded channel is correct is less than a predetermined value then it is considered that the left and right signals are different enough to be treated differently, and noise masking is indicated by binary signal 53. Other possible ways of determining whether noise masking should be used include, but are not restricted to, considering absolute and relative signal powers, signal correlation, adaptive filtering and signal separation techniques.

If noise masking is to be applied then one of the signals (the signal to the telephony ear) is considered to comprise speech and the other of the signals (the signal to the non-telephony ear) is considered to comprise noise.

If noise masking is indicated a leveller 52 sets the root mean square (RMS) level of the speech signal (the right channel) to a first predetermined RMS level, and the level of the non-speech signal (the left channel) is adjusted by the same amount.

If noise masking is not indicated then both of the signals are considered to comprise speech. In this case the leveller 52 sets the average level for both speech signals to a second predetermined level which is greater than the first predetermined level (in this case 3 dB louder) in order to take into account the fact that signals which are heard via both ears are perceived to be louder.

The reference signal is also level aligned by leveller 52' to the same RMS as that used for the degraded signal.

In the binaural speech assessment apparatus, auditory transformer 4 is unchanged except for the fact that the transform is applied to both channels of the pre-processed stereo signal so auditory transformers 4a and 4b will not be described further. Auditory transformers 4a and 4b produce sensation surfaces 1a" and 2a", 1b" and 2b". Two sensation surfaces 1a" and 1b" relating to the reference signal are produced because in the auditory transformer the reference signal may be modified during compensation in relation to the degraded signal so sensation surfaces 1a" and 1b" may be different from one another.

Figure 6:
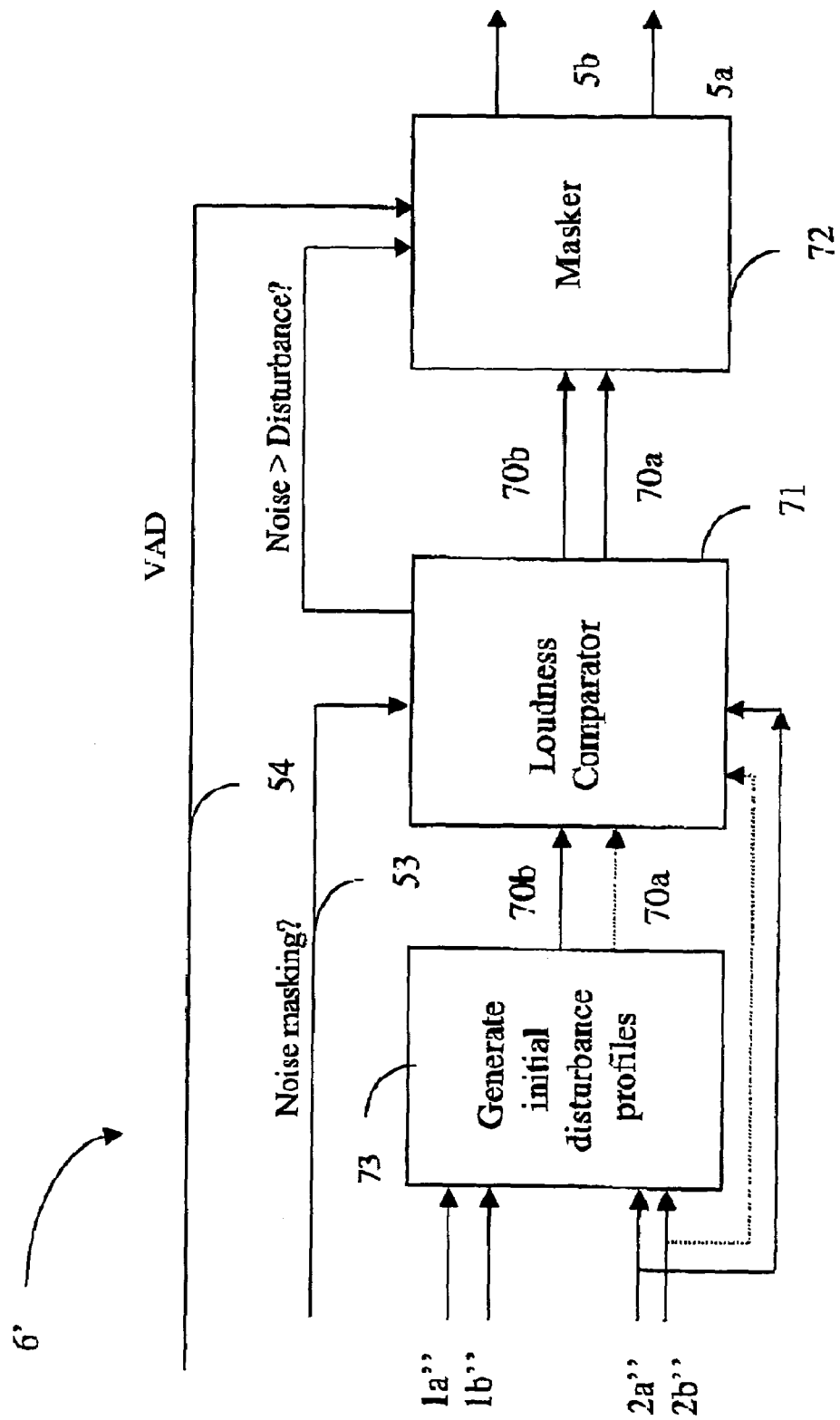
FIG. 6 illustrates a comparator for generating a disturbance profile in accordance with the present invention.

FIG. 6 illustrates a comparator 6', which receives sensation surfaces 1a" and 1b" and sensation surfaces 2a", 2b" from the auditory transformers 4a, 4b.

An initial disturbance profile is generated by profile generator 73 finding the difference between the reference signal sensation surfaces 1a" and 1b" and the degraded signal sensation surfaces 2a" and 2b" for each channel, thus producing an initial left disturbance profile 70a and an initial right disturbance profile 70b. If noise masking is indicated then the sensation surface of the channel which is considered to contain noise is compared to the disturbance profile for the channel which is considered to contain speech by loudness comparator 71. For example, if the left channel is considered to contain noise and the right channel is considered to contain speech (as in the embodiment of the invention described here), then the left degraded signal sensation surface 2a" is compared to the right, disturbance profile 70b as illustrated by the solid lines connecting profile generator 73 and loudness comparator 71 in FIG. 6. If the noise is greater than the disturbance then masking is applied to the initial disturbance profile for the channel which contains speech (70b) by the masker 72 to produce disturbance profiles 5a, 5b.

In one embodiment of the invention the disturbance profile for the channel which contains speech is multiplied by a predetermined factor of 0.5. In another embodiment of the invention the disturbance profile is multiplied by a predetermined factor of 0.25. The disturbance profiles are then used by the modeller 7 to generate an Objective Speech Quality Score.

As mentioned previously the time aligners (23a, 23b) use a voice activity detector to aid the alignment process. An output 54 from the voice activity detector may be used by the masker 72 such that the masking applied to a portion of the disturbance profile is dependent upon whether the portion of the reference signal generating that portion of the disturbance profile is considered to be speech or noise by the voice activity detector.

For example, one predetermined factor may be applied to portions comprising speech and another predetermined factor may be applied to portions comprising noise. Either predetermined factor may be set to one so that noise masking may be applied only to portions comprising speech or only to portions comprising noise.

If noise masking is not indicated then the initial disturbance profiles are not modified by the masker 72.

Figure 7:
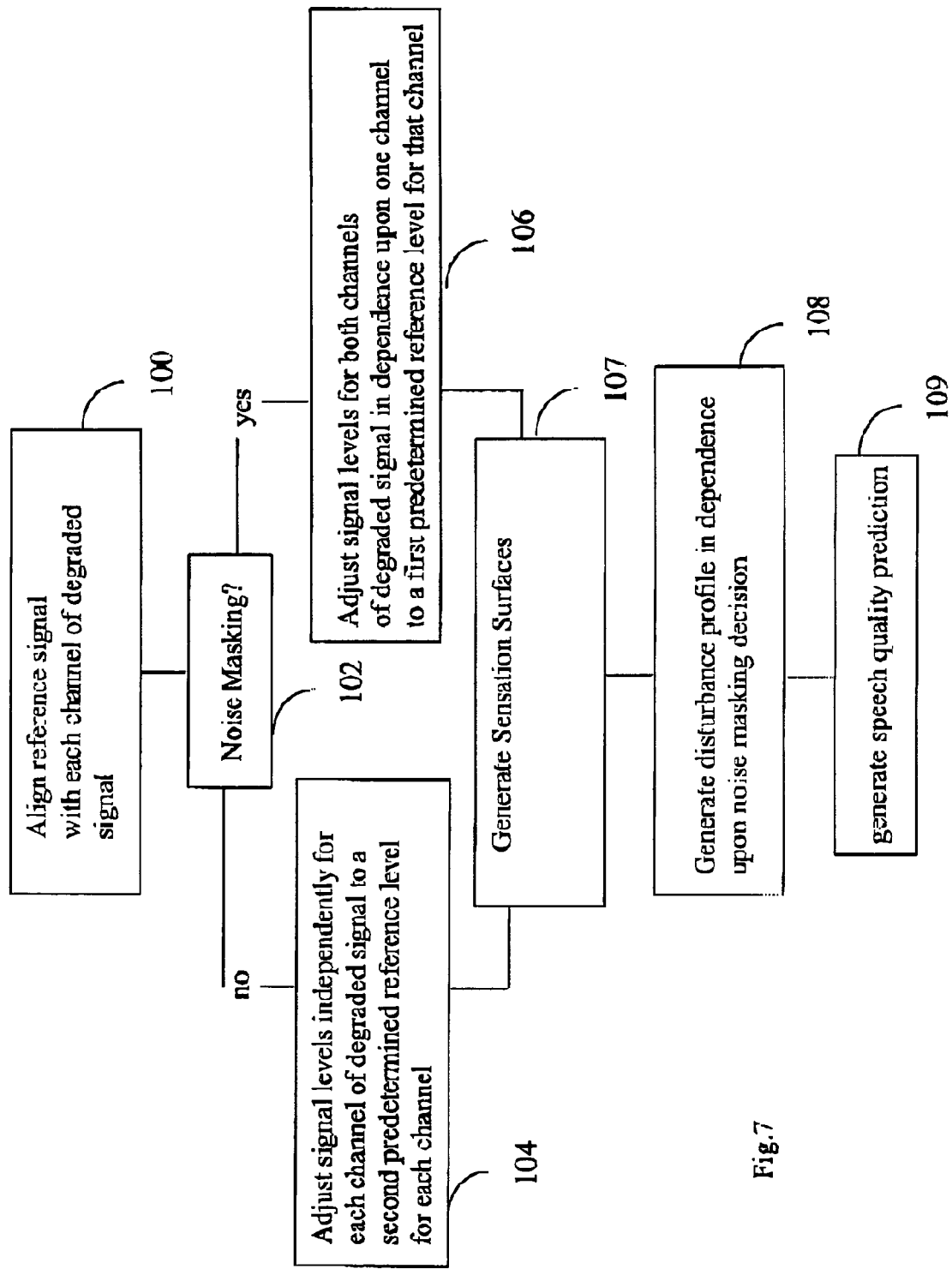
FIG. 7 is a flow chart illustrating the steps of a method according to the present invention.

A method according to the present invention, will now be described with reference to FIG. 7 together with FIGS. 5 and 6).

At step 100, reference signal 1 is aligned with reference signals 2a and 2b by time aligners 23a and 23b respectively.

At step 102 noise masking determiner 51 compares parameters of the two signals in order to decide whether they are similar to each other or not. In this embodiment of the invention the similarity decision is based on the respective delays 25a, 25b and confidence values 26a, 26b produced by the time aligners 23a 23b, although as stated previously other techniques could equally well be used.

If the signals are not similar then noise masking is required, and leveller 52 adjusts the level of each channel of the signal at step 106 such that the channel containing speech achieves a first predetermined RMS level, and the channel containing noise is adjusted by the same amount.

If they are similar than noise masking is not required, and at step 104 leveller 52 adjusts the level of each signal 2a, 2b in order to achieve a RMS signal value of a second predetermined level which is 3 dB higher than the first predetermined level. Although no noise masking is to be performed, the increase in level will affect the resulting sensation surfaces 2a" and 2b" and thus the resulting disturbance profiles 5a, 5b.

At step 107 sensations surfaces 1a", 1b", 2a" and 2b" are generated as described previously.

At step 108 comparator 6' generates the disturbance profiles 5a, 5b, in dependence upon the noise masking indicator 53, as described previously with reference to FIG. 6.

Finally at step 109 the speech quality prediction is generated by modeller 7.

Although this invention has been described with reference to a particular embodiment of an intrusive quality assessment system, it is equally applicable to non-intrusive quality assessment systems.

It will be understood by those skilled in the art that the processes described above may be implemented on a conventional programmable computer, and that a computer program encoding instructions for controlling the programmable computer to perform the above methods may be provided on a computer readable medium.

The invention claimed is:

1. An apparatus for assessing the perceptual quality of speech signals transmitted via a telecommunications network and recorded acoustically from an acoustic terminal device comprising:
   a front end processor for aligning a mono reference signal comprising a single channel with a degraded stereo signal comprising a first channel and a second channel, said front end processor comprising a leveller for adjusting the power levels of said signals and a time aligner for determining the estimated delays for each of said channels of said degraded signal;
   an auditory transformer for generating a set of perceptually relevant parameters for each of said signals; and
   a comparator for comparing said perceptually relevant parameters to generate disturbance profiles; and
   a modeller for generating a speech quality prediction in dependence upon said disturbance profiles;
   in which said front end processor further comprises
   a noise masking determiner for comparing signal parameters of each of said channels of said degraded signal and generating a noise masking indicator in dependence upon said parameters; and in which said disturbance profiles are dependent upon said noise masking indicator.

2. An apparatus according to claim 1 in which said leveller adjusts the level of said signals in dependence upon whether noise masking is indicated.

3. An apparatus according to claim 1, in which the comparator is arranged to receive the noise masking indicator and in which the comparator is arranged to modify a disturbance profile in dependence upon a comparison between a disturbance profile for one channel and a set of perceptually relevant parameters for another channel when noise masking is indicated.

4. An apparatus according to claim 3, in which the comparator is arranged to receive a voice activity signal and in which the disturbance profile is modified in dependence upon said voice activity signal.

5. An apparatus according to claim 1, in which said estimated delays comprise said signal parameters.

6. An apparatus according to claim 5, in which said noise masking determiner further comprises means for receiving an estimate of the confidence that each of said estimated delays is correct, and in which said noise masking indicator is generated in further dependence upon said estimated confidences.

7. An apparatus according to claim 1, in which said leveller is arranged
   a) to adjust the level of each of said channels of the degraded signal in dependence upon only one channel of the signal when noise masking is indicated; and
   b) to adjust the level of each of said channels of the degraded signal independently when noise masking is not indicated.

8. An apparatus according to claim 7, in which said leveller is arranged to adjust the level of both channels in order to achieve a first predetermined RMS power level for said one channel at step a) and in which said levelling means is arranged to adjust the level of each of said channels to achieve a second predetermined RMS power level for both channels at step b).

9. An apparatus according to claim 8, in which said second predetermined level is greater than said first predetermined level.

10. A method of assessing the perceptual quality of stereo speech signals transmitted via a telecommunications network and recorded acoustically from an acoustic terminal device comprising the steps of:
    aligning a mono reference signal comprising a single channel with a degraded stereo signal comprising a first channel and a second channel;
    estimating a delay between each channel of said degraded signal and said reference signal;
    generating a noise masking indicator in dependence upon a comparison of corresponding signal parameters for each channel;
    generating a set of perceptually relevant parameters for each of said reference and degraded signals;
    comparing said perceptually relevant parameters of the reference signal with the perceptually relevant parameters of the degraded signal to generate disturbance profiles; and
    generating a speech quality prediction in dependence upon said disturbance profiles; wherein said generated disturbance profiles are dependent upon said noise masking indicator.

11. A method according to claim 10, further comprising the step of adjusting the level of the degraded signals in dependence upon said noise masking indicator.

12. A method according to claim 10, in which the comparing step comprises the sub-step of:
    modifying a disturbance profile in dependence upon a comparison between a disturbance profile for one channel and a set of perceptually relevant parameters for the other channel when noise masking is indicated by said noise masking indicator.

13. A method according to claim 12, in which said modifying step is performed in dependence upon a voice activity signal.

14. A method according to claim 10, in which said estimated delays comprise said signal parameters.

15. A method according to claim 14, further comprising the step of estimating a confidence that each of said estimated delays is correct and generating the noise masking indicator (53) in dependence thereon.

16. A method according to claim 10, further comprising the steps of:
    c) adjusting the level of each of said channels of the degraded signal in dependence upon only one channel of the signal when noise masking is indicated; and
    d) adjusting the level of each of said channels of the degraded signal when noise masking is not indicated.

17. A method according to claim 16, in which step c) comprises adjusting the level of both channels in order to achieve a first predetermined RMS power level for one channel and in which step d) comprises adjusting the level of both channels independently to achieve a second predetermined RMS power level for both channels.

18. A method according to claim 17, in which the first predetermined level is greater than the second predetermined level.

19. A computer readable medium carrying a computer program for implementing the method according to claim 10.

* * * * *